United States Patent
Kobashi et al.

(10) Patent No.: US 11,162,405 B2
(45) Date of Patent: Nov. 2, 2021

(54) EXHAUST PURIFICATION SYSTEM OF INTERNAL COMBUSTION ENGINE

(71) Applicant: TOYOTA JIDOSHA KABUSHIKI KAISHA, Aichi-ken (JP)

(72) Inventors: Noriyasu Kobashi, Hachioji (JP); Noriyasu Adachi, Numazu (JP); Yusuke Saito, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 31 days.

(21) Appl. No.: 16/730,055

(22) Filed: Dec. 30, 2019

(65) Prior Publication Data

US 2020/0217235 A1 Jul. 9, 2020

(30) Foreign Application Priority Data

Jan. 7, 2019 (JP) .............................. JP2019-000590

(51) Int. Cl.
*F01N 3/035* (2006.01)
*F01N 11/00* (2006.01)
*B01D 46/44* (2006.01)

(52) U.S. Cl.
CPC .......... *F01N 11/002* (2013.01); *B01D 46/446* (2013.01); *B01D 46/448* (2013.01); *F01N 3/035* (2013.01); *B01D 2279/30* (2013.01); *F01N 2550/04* (2013.01)

(58) Field of Classification Search
CPC ............. F01N 2560/08; F01N 2560/06; F01N 2900/1606; F01N 11/002; F01N 3/035; F01N 2550/04; B01D 46/446; B01D 46/448; B01D 2279/30

See application file for complete search history.

(56) References Cited

U.S. PATENT DOCUMENTS

| 2006/0026950 A1* | 2/2006 | Kondou ............. F02D 41/1401 60/297 |
| 2008/0276599 A1* | 11/2008 | Hosaka ................... F01N 3/027 60/286 |
| 2009/0094963 A1 | 4/2009 | Mizoguchi et al. |

(Continued)

FOREIGN PATENT DOCUMENTS

| JP | 2005-226547 A | 8/2005 |
| JP | 4172497 B2 | 10/2008 |
| JP | 6325420 B2 | 5/2018 |

*Primary Examiner* — Matthew T Largi
(74) *Attorney, Agent, or Firm* — Hauptman Ham, LLP

(57) ABSTRACT

An exhaust purification system of an internal combustion engine comprises a filter trapping particulate matter in exhaust gas, a differential pressure sensor detecting a differential pressure before and after the filter or a differential pressure between a pressure in the exhaust passage and an atmospheric pressure, a temperature sensor detecting a temperature of exhaust gas, and a deposition calculating part configured to calculate an amount of particulate matter deposited at the filter. The deposition calculating part is configured to calculate a first estimated value of an amount of the particulate matter based on the differential pressure, calculate a second estimated value of an amount of the particulate matter based on an amount of increase of temperature of the exhaust gas, and calculate an amount of the particulate matter based on the first estimated value and the second estimated value.

10 Claims, 11 Drawing Sheets

(56) References Cited

U.S. PATENT DOCUMENTS

| | | | | |
|---|---|---|---|---|
| 2010/0269490 A1* | 10/2010 | Kanaya | ............... | B01D 46/46 |
| | | | | 60/287 |
| 2010/0319319 A1* | 12/2010 | Ide | ............... | F01N 11/002 |
| | | | | 60/277 |
| 2014/0318883 A1* | 10/2014 | Noguchi | ............... | F01N 3/0235 |
| | | | | 180/309 |
| 2018/0017012 A1* | 1/2018 | Suchta | ............... | F02D 41/029 |
| 2019/0093578 A1* | 3/2019 | Nose | ............... | F02D 41/1408 |

* cited by examiner

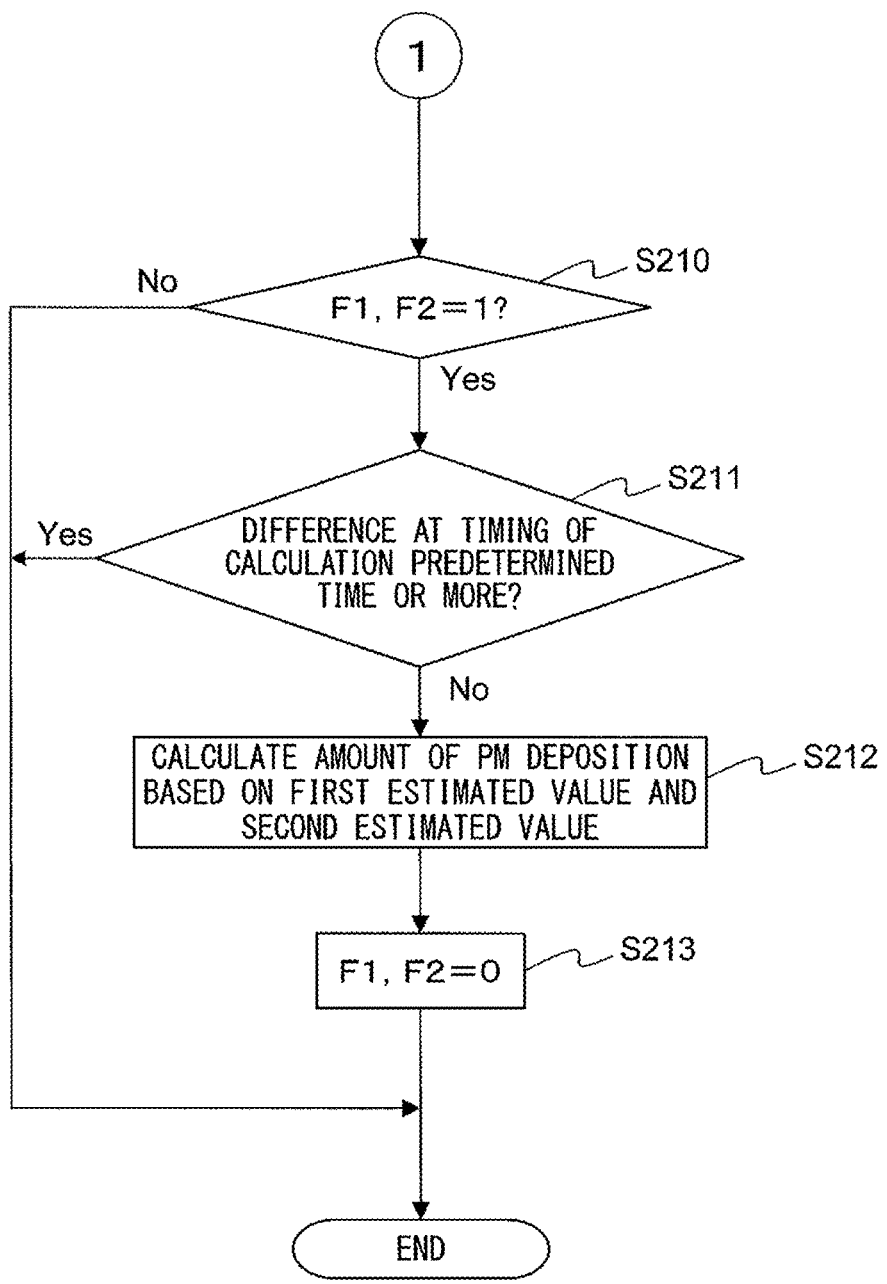

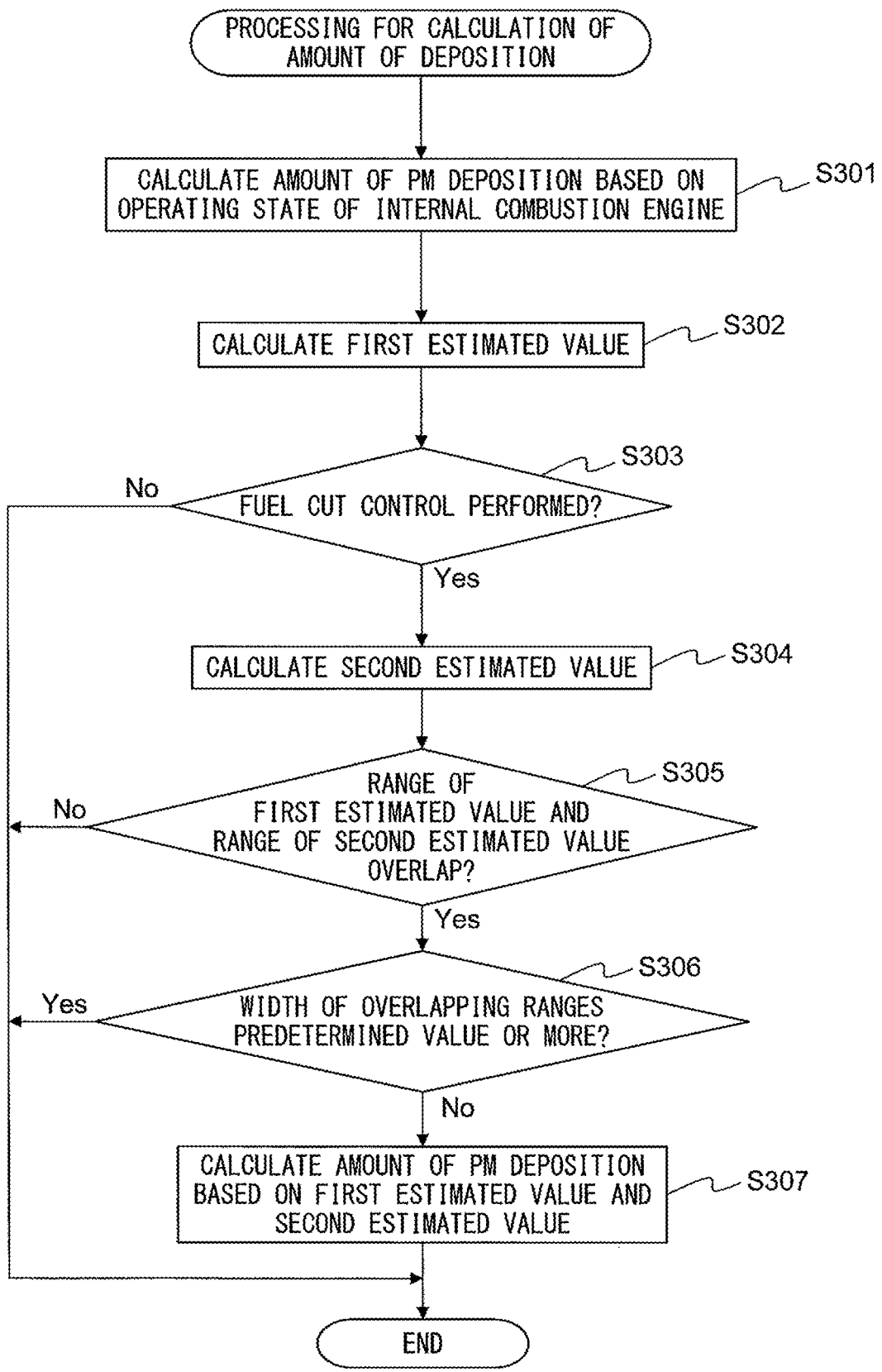

EXHAUST PURIFICATION SYSTEM OF INTERNAL COMBUSTION ENGINE

RELATED APPLICATIONS

The present application claims priority of Japanese Patent Application No. 2019-000590, filed Jan. 7, 2019, the disclosure of which is hereby incorporated by reference herein in its entirety.

FIELD

The present invention relates to an exhaust purification system of an internal combustion engine.

BACKGROUND

In the past, to improve exhaust emissions, it has been known to provide a filter for trapping particulate matter (PM) in exhaust gas in an exhaust passage of an internal combustion engine.

However, if the amount of PM deposited on the filter becomes greater, the filter clogs and the back pressure increases. For this reason, when the amount of deposition of PM is large, to prevent damage to the internal combustion engine, sometimes the output of the internal combustion engine etc., has to be limited. Further, if the PM on the filter is burned off when the amount of deposition of PM is large, the temperature of the filter excessively increases and the filter is liable to deteriorate.

For this reason, to suitably control an internal combustion engine in accordance with an amount of deposition of PM, it is desirable to be able to precisely calculate the amount of deposition of PM. In relation to this, PTL 1 describes providing a temperature sensor at the exhaust passage at a downstream side of the filter and calculating the amount of deposition of PM based on the temperature of the exhaust gas detected by the temperature sensor when the PM is burned off.

CITATIONS LIST

Patent Literature

[PTL 1] Japanese Unexamined Patent Publication No. 2005-226547

SUMMARY

Technical Problem

However, the temperature of the exhaust gas at the downstream side of the filter detected by the temperature sensor fluctuates due to individual differences in temperature sensors, the outside air temperature, etc. For this reason, in the art described in PTL 1, it is difficult to precisely calculate the amount of deposition of PM.

Therefore, considering this problem, an object of the present invention is to raise the precision of calculation of an amount of PM deposited on a filter arranged in an exhaust passage of an internal combustion engine.

Solution to Problem

The summary of the present disclosure is as follows.

(1) An exhaust purification system of an internal combustion engine comprising: a filter arranged in an exhaust passage of the internal combustion engine and trapping particulate matter in exhaust gas, a differential pressure sensor detecting a differential pressure before and after the filter or a differential pressure between a pressure in the exhaust passage at an upstream side from the filter and an atmospheric pressure, a temperature sensor arranged in the exhaust passage at a downstream side from the filter and detecting a temperature of exhaust gas flowing out from the filter, and a deposition calculating part configured to calculate an amount of particulate matter deposited at the filter, wherein the deposition calculating part is configured to calculate a first estimated value of an amount of the particulate matter based on the differential pressure, calculate a second estimated value of an amount of the particulate matter based on an amount of increase of temperature of the exhaust gas due to supply of oxygen to the filter, and calculate an amount of the particulate matter based on the first estimated value and the second estimated value.

(2) The exhaust purification system of an internal combustion engine described in above (1), wherein the deposition calculating part is configured to calculate a value in a range where a range of the first estimated value and a range of the second estimated value overlap as an amount of the particulate matter.

(3) The exhaust purification system of an internal combustion engine described in above (2), wherein the deposition calculating part is configured to calculate a maximum value in the range where the range of the first estimated value and the range of the second estimated value overlap as an amount of the particulate matter.

(4) The exhaust purification system of an internal combustion engine described in above (2) or (3), wherein the deposition calculating part is configured not to calculate the amount of the particulate matter based on the first estimated value and the second estimated value if a width of the range where the range of the first estimated value and the range of the second estimated value overlap is equal to or more than a predetermined value.

(5) The exhaust purification system of an internal combustion engine described in any one of above (1) to (4), wherein the deposition calculating part is not configured to calculate the first estimated value based on the differential pressure detected by the differential pressure sensor when an amount of flow of the exhaust gas flowing into the filter is equal to or more than a predetermined amount of flow.

(6) The exhaust purification system of an internal combustion engine described in above (5), wherein the deposition calculating part is configured to calculate the first estimated value based on the differential pressure detected by the differential pressure sensor when the amount of flow of the exhaust gas is equal to or more than the predetermined amount of flow and an amount of fluctuation of the amount of flow is equal to or less than a predetermined value.

(7) The exhaust purification system of an internal combustion engine described in any one of above (1) to (6), wherein the deposition calculating part is configured to calculate the second estimated value based on an amount of increase of temperature of the exhaust gas when fuel cut control stopping supply of fuel to combustion chambers of the internal combustion engine is performed.

(8) The exhaust purification system of an internal combustion engine described in any one of above (1) to (7), wherein the deposition calculating part is configured to calculate the second estimated value only when a temperature of the filter when supply of oxygen to the filter is started is equal to or more than a predetermined temperature.

(9) The exhaust purification system of an internal combustion engine described in any one of above (1) to (8), wherein the deposition calculating part is configured not to calculate the amount of the particulate matter based on the first estimated value and the second estimated value if a difference between a timing of calculation of the first estimated value and a timing of calculation of the second estimated value is equal to or more than a predetermined time, if a total of an amount of intake air supplied to combustion chambers of the internal combustion engine between the timing of calculation of the first estimated value and the timing of calculation of the second estimated value is equal to or more than a predetermined amount, or if a total of an amount of fuel supplied to the combustion chambers of the internal combustion engine between the timing of calculation of the first estimated value and the timing of calculation of the second estimated value is equal to or more than a predetermined amount.

(10) The exhaust purification system of an internal combustion engine described in any one of above (1) to (9), wherein the deposition calculating part is configured to calculate the amount of the particulate matter based on an operating state of the internal combustion engine if not calculating the amount of the particulate matter based on the first estimated value and the second estimated value.

(11) The exhaust purification system of an internal combustion engine described in any one of above (1) to (10), further comprising a catalyst arranged in the exhaust passage at an upstream side from the filter, wherein the deposition calculating part is configured to calculate the second estimated value considering a concentration of oxygen in the exhaust gas flowing into the filter if the catalyst is supplied with fuel when the filter is supplied with oxygen.

Advantageous Effects of Invention

According to the present invention, it is possible to raise the precision of calculation of an amount of PM deposited on a filter arranged in an exhaust passage of an internal combustion engine.

BRIEF DESCRIPTION OF DRAWINGS

FIG. 11B is a flow chart showing a control routine of processing for calculation of an amount of deposition in a second embodiment of the present invention.

FIG. 12 is a flow chart showing a control routine of processing for calculation of an amount of deposition in a third embodiment of the present invention.

DESCRIPTION OF EMBODIMENTS

Figure 1:
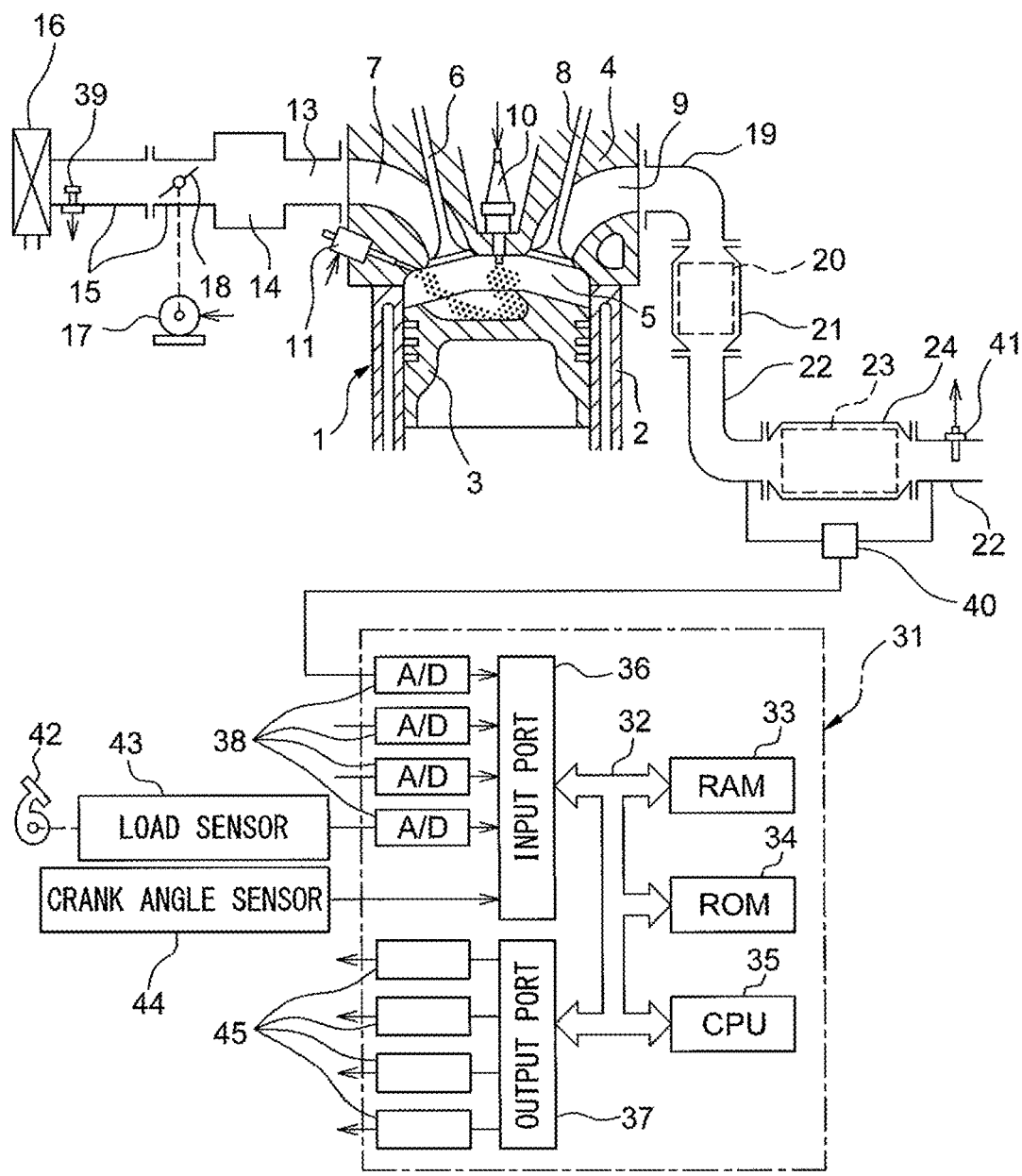
FIG. 1 is a view schematically showing an internal combustion engine to which an exhaust purification system of an internal combustion engine according to a first embodiment of the present invention is applied.

Below, referring to the drawings, embodiments of the present invention will be explained in detail. Note that, in the following explanation, similar component elements are assigned the same reference numerals.

First Embodiment

Below, referring to FIG. 1 to FIG. 10, a first embodiment of the present invention will be explained.

<Configuration of Internal Combustion Engine>

FIG. 1 is a view schematically showing an internal combustion engine to which an exhaust purification system of an internal combustion engine according to the first embodiment of the present invention is applied. The internal combustion engine is a spark ignition type internal combustion engine, specifically, a gasoline engine fueled by gasoline. The internal combustion engine is mounted in a vehicle.

The internal combustion engine is provided with an engine body 1 including a cylinder block 2 and a cylinder head 4. Inside the cylinder block 2, a plurality of cylinders are formed. In the cylinders, pistons 3 reciprocating in the axial directions of the cylinders are arranged. Between the pistons 3 and cylinder head 4, combustion chambers 5 are formed.

The cylinder head 4 is formed with intake ports 7 and exhaust ports 9. The intake ports 7 and exhaust ports 9 are connected to the combustion chambers 5. The internal combustion engine is further provided with intake valves 6 and exhaust valves 8 arranged in the cylinder head 4. The intake valves 6 open and close the intake ports 7, while the exhaust valves 8 open and close the exhaust ports 9.

The internal combustion engine is further provided with spark plugs 10 and fuel injectors 11. The spark plugs 10 are arranged at the center parts of the inside wall surfaces of the cylinder head 4 and generate sparks in response to ignition signals. The fuel injectors 11 are arranged at the peripheral parts of the inside wall surfaces of the cylinder head 4 and inject fuel into the combustion chambers 5 in response to injection signals. In the present embodiment, as the fuel, gasoline with a stoichiometric air-fuel ratio of 14.6 is used.

The internal combustion engine is further provided with intake runners 13, a surge tank 14, intake pipe 15, air cleaner 16, and throttle valve 18. The intake ports 7 of the cylinders are respectively connected through corresponding intake runners 13 to the surge tank 14. The surge tank 14 is connected through the intake pipe 15 to the air cleaner 16. The intake ports 7, intake runners 13, surge tank 14, intake pipe 15, etc., form an intake passage guiding air to the combustion chambers 5. The throttle valve 18 is arranged inside the intake pipe 15 between the surge tank 14 and air cleaner 16 and is driven by a throttle valve drive actuator 17 (for example, DC motor). The throttle valve 18 is made to turn by the throttle valve drive actuator 17, whereby it is possible to change the open area of the intake passage corresponding to the opening degree.

The internal combustion engine is further provided with an exhaust manifold 19, exhaust pipe 22, catalyst 20, and filter 23. The exhaust ports 9 of the cylinders are connected to the exhaust manifold 19. The exhaust manifold 19 has a plurality of branch parts connected to the exhaust ports 9 and a plenum where these branch parts are collected. The plenum of the exhaust manifold 19 is connected to an upstream side casing 21 having the catalyst 20 built into it. The upstream side casing 21 is connected through the exhaust pipe 22 to a downstream side casing 24 having the filter 23 built into it. The exhaust ports 9, exhaust manifold 19, upstream side casing 21, exhaust pipe 22, downstream side casing 24, etc., form an exhaust passage discharging exhaust gas generated by combustion of the air-fuel mixture in the combustion chambers 5.

The various control operations of the internal combustion engine are performed by an electronic control unit (ECU) 31 based on the outputs of various types of sensors provided at the internal combustion engine etc. The ECU 31 is comprised of a digital computer provided with components connected with each other through bidirectional buses 32 such as a RAM (random access memory) 33, ROM (read only memory) 34, CPU (microprocessor) 35, input port 36, and output port 37.

The ECU 31 receives as input the outputs of various types of sensors. In the present embodiment, outputs of an air flow meter 39, differential pressure sensor 40, temperature sensor 41, load sensor 43, and crank angle sensor 44 are input to the ECU 31.

The air flow meter 39 is arranged in the intake passage, specifically inside the intake pipe 15 at the upstream side from the throttle valve 18. The air flow meter 39 detects the amount of flow of the air flowing through the intake passage. The air flow meter 39 is electrically connected to the ECU 31. The output of the air flow meter 39 is input through a corresponding AD converter 38 to the input port 36.

The differential pressure sensor 40 is arranged in the exhaust passage and detects a differential pressure between a pressure in the exhaust passage at the upstream side from the filter 23 and a pressure in the exhaust passage at the downstream side from the filter 23, that is, the differential pressure before and after the filter 23. The differential pressure sensor 40 is electrically connected to the ECU 31. The output of the differential pressure sensor 40 is input through a corresponding AD converter 38 to the input port 36.

The temperature sensor 41 is arranged in the exhaust passage at the downstream side from the filter 23 (specifically, the exhaust pipe 22) and detects the temperature of the exhaust gas flowing out from the filter 23. The temperature sensor 41 is electrically connected to the ECU 31. The output of the temperature sensor 41 is input through a corresponding AD converter 38 to the input port 36.

The load sensor 43 is connected to an accelerator pedal 42 provided at the vehicle mounting the internal combustion engine and detects the amount of depression of the accelerator pedal 42. The load sensor 43 is electrically connected to the ECU 31. The output of the load sensor 43 is input through a corresponding AD converter 38 to the input port 36. The CPU 35 calculates the engine load based on the output of the load sensor 43.

The crank angle sensor 44 generates an output pulse each time a crankshaft of the internal combustion engine rotates by a predetermined angle (for example, 15 degrees). The crank angle sensor 44 is electrically connected to the ECU 31. The output of the crank angle sensor 44 is input to the input port 36. The CPU 35 calculates the engine speed based on the output of the crank angle sensor 44.

On the other hand, the output port 37 is connected through corresponding drive circuits 45 to the spark plugs 10, fuel injectors 11, and throttle valve drive actuator 17. The CPU 35 controls these. Specifically, the CPU 35 controls the ignition timings of the spark plugs 10, the injection timings and injection amounts of the fuel injected from the fuel injectors 11, and the opening degree of the throttle valve 18.

<Exhaust Purification System of Internal Combustion Engine>

Below, an exhaust purification system of an internal combustion engine according to the first embodiment of the present invention (below, referred to simply as the "exhaust purification system") will be explained.

The exhaust purification system is provided with a catalyst 20 and a filter 23 arranged in an exhaust passage of the internal combustion engine. As shown in FIG. 1, the catalyst 20 is arranged in the exhaust passage at the upstream side from the filter 23. The catalyst 20 removes the harmful substances in the exhaust gas. For example, the catalyst 20 is a three-way catalyst which can simultaneously remove hydrocarbons (HC), carbon monoxide (CO), and nitrogen oxides ($NO_X$) in the exhaust gas.

The filter 23 traps particulate matter (PM) in the exhaust gas. In the present embodiment, the filter 23 is a gasoline particulate filter (GPF).

If exhaust gas containing PM flows into the filter 23, the PM deposits on the filter 23. If the amount of PM deposited on the filter 23 becomes greater, closure (clogging) of the filter 23 occurs. As a result, the discharge of exhaust gas through the filter 23 is obstructed and the back pressure increases.

On the other hand, if oxygen is supplied to the filter 23 when the temperature of the filter 23 is high, the PM deposited on the filter 23 is oxidized and burned off. This phenomenon is called "regeneration" of the filter 23. By regenerating the filter 23, the amount of PM deposited on the filter 23 can be decreased.

Figure 2:
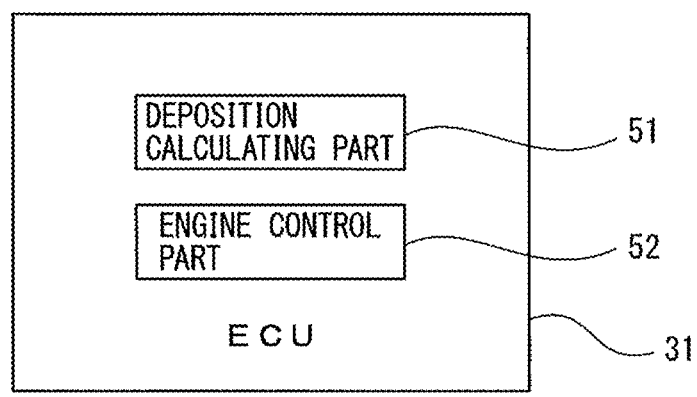
FIG. 2 is a functional block diagram of an ECU.

The exhaust purification system is further provided with a deposition calculating part 51 and engine control part 52. FIG. 2 is a functional block diagram of the ECU 31. In the present embodiment, the ECU 31 has the deposition calculating part 51 and the engine control part 52. The deposition calculating part 51 and the engine control part 52 are functional blocks realized by a program stored in the ROM 34 of the ECU 31 run by the CPU 35 of the ECU 31.

The deposition calculating part 51 calculates the amount of PM deposited on the filter 23 (below, referred to as the "amount of PM deposition"). If PM deposits on the filter 23, the filter 23 clogs and the pressure in the exhaust passage at the upstream side from the filter 23 becomes higher than the pressure in the exhaust passage at the downstream side from the filter 23. Further, the greater the amount of PM deposition, the greater the differential pressure before and after the filter 23 becomes. For this reason, the method of calculating the amount of PM deposition based on the differential pressure before and after the filter 23 (below, referred to as the "differential pressure method") may be considered.

Figure 3:
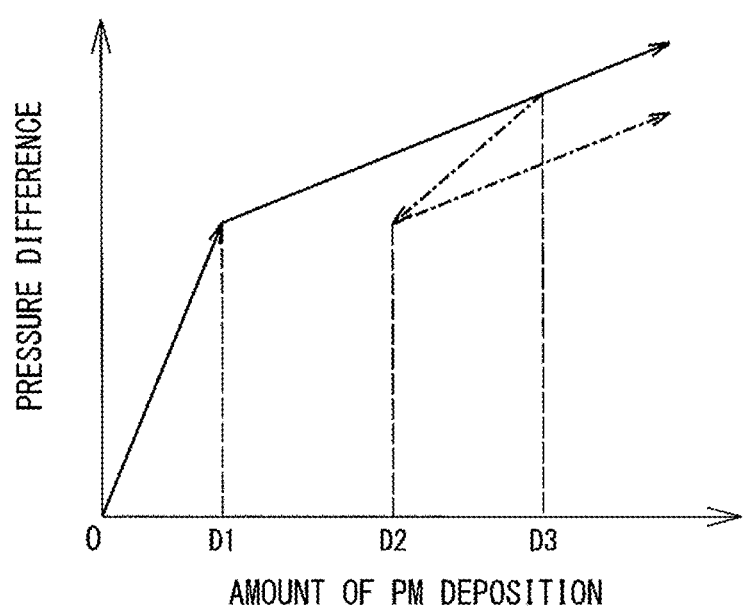
FIG. 3 is a view showing a relationship between a differential pressure before and after a filter and an amount of deposition of PM.

However, the relationship between the differential pressure before and after the filter 23 and the amount of PM deposition changes according to the state of deposition of PM. FIG. 3 is a view showing the relationship between the differential pressure before and after the filter 23 and the amount of PM deposition. The solid line in the figure shows the relationship between the differential pressure and the amount of PM deposition when the filter 23 is not regenerated. On the other hand, the one-dot chain line in the figure shows the relationship between the differential pressure and the amount of PM deposition in the case where the filter 23 is regenerated.

When the filter 23 traps PM, the PM first deposits at the insides of the walls of the filter 23. In the example of FIG. 3, when the amount of PM deposition increases from zero to D1, PM deposits inside the walls of the filter 23. At this time, the amount of increase of the differential pressure before and after the filter 23 (slant in the figure) becomes larger.

If the insides of the walls of the filter 23 are filled with PM, next the PM deposits on the surfaces of the walls of the filter 23. In the example of FIG. 3, PM deposits on the surfaces of the walls of the filter 23, whereby the amount of PM deposition gradually increases from D2. At this time, compared with when PM deposits at the insides of the walls of the filter 23, the amount of increase of the differential pressure before and after the filter 23 becomes smaller.

Further, if the filter 23 is regenerated when the amount of PM deposition is D3, the amount of PM deposition decreases from D3 to D2. Further, along with the decrease of the amount of PM deposition, the differential pressure before and after the filter 23 falls. At this time, the PM deposited at the insides of the walls of the filter 23 is first burned off. For this reason, the amount of fall of the differential pressure before and after the filter 23 becomes larger. After that, if exhaust gas containing PM again flows into the filter 23, as shown by the one-dot chain line, the amount of PM deposition gradually increases from D2.

As will be understood from FIG. 3, if the filter 23 is regenerated, the state of deposition of PM changes and the relationship between the differential pressure before and after the filter 23 and the amount of PM deposition changes. For this reason, error occurs in the amount of PM deposition calculated by the differential pressure method.

Further, when PM burns due to the supply of oxygen to the filter 23, the heat of reaction causes the temperature of the filter 23 to increase. As a result, the temperature of the exhaust gas flowing out from the filter 23 (below, referred to as the "outflowing exhaust gas") also increases.

Figure 4:
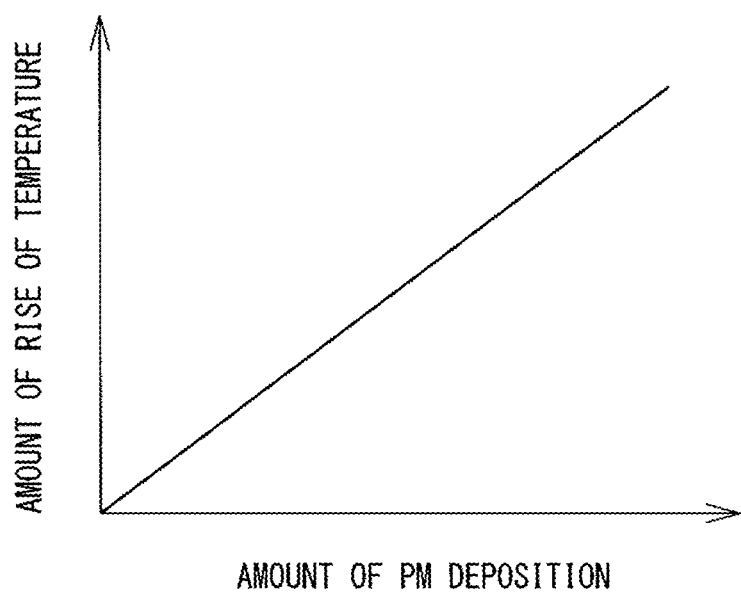
FIG. 4 is a view showing a relationship between an amount of increase of temperature of outflowing exhaust gas when oxygen is supplied to a high temperature filter and an amount of deposition of PM.

FIG. 4 is a view showing the relationship between the amount of increase of the temperature of the outflowing exhaust gas when oxygen is supplied to a high temperature filter 23 and the amount of PM deposition. As shown in FIG. 4, the amount of increase of the temperature of the outflowing exhaust gas becomes larger in proportion to the amount of PM deposition. For this reason, the method of calculating the amount of PM deposition based on the amount of increase of the temperature of the outflowing exhaust gas due to the supply of oxygen to the filter 23 (below, referred to as the "temperature method") may be considered.

However, the temperature of the outflowing exhaust gas detected by the temperature sensor 41 fluctuates due to individual differences in the temperature sensor 41, the outside air temperature, etc. Further, if the filter 23 is supplied with oxygen when the temperature of the filter 23 is low, the burning of the PM is inhibited and the variation in the amount of increase of the temperature of the outflowing exhaust gas becomes greater. For this reason, error occurs in the amount of PM deposition calculated by the temperature method.

Therefore, there is room for improvement in the method of calculation of the amount of PM deposition. Therefore, in the present embodiment, the final amount of PM deposition is calculated based on the amount of PM deposition calculated by the differential pressure method and the amount of PM deposition calculated by the temperature method. Due to this, it is possible to improve the precision of calculation of the amount of PM deposition. Below, the specific method of calculation of the amount of PM deposition used by the deposition calculating part 51 will be explained.

The deposition calculating part 51 calculates the first estimated value of the amount of PM deposition based on the differential pressure before and after the filter 23. The first estimated value corresponds to the amount of PM deposition calculated by the differential pressure method. Further, the deposition calculating part 51 calculates the second estimated value based on the amount of increase of the temperature of the outflowing exhaust gas due to the supply of oxygen to the filter 23. That is, the deposition calculating part 51 calculates the second estimated value based on the amount of increase of the temperature of the outflowing exhaust gas when the filter 23 is supplied with oxygen. The second estimated value corresponds to the amount of PM deposition calculated by the temperature method.

In the internal combustion engine, when a predetermined condition for performance is satisfied, fuel cut control stopping the supply of fuel to the combustion chambers 5 is performed. The predetermined condition for performance is satisfied when, for example, the amount of depression of the accelerator pedal 42 is zero or substantially zero (that is, the engine load is zero or substantially zero) and the engine speed is equal to or higher than a predetermined speed higher than the speed at the time of idling.

If fuel cut control is performed, air is supplied from the intake passage to the exhaust passage and oxygen is supplied to the filter 23. At this time, the concentration of oxygen in the exhaust gas becomes maximum. For this reason, in the present embodiment, the deposition calculating part 51 calculates the second estimated value of the amount of PM deposition based on the amount of increase of the temperature of the outflowing exhaust gas when fuel cut control is performed. By doing this, the second estimated value is calculated when the concentration of oxygen in the exhaust gas supplied to the filter 23 is substantially constant, so the reliability of the second estimated value can be raised.

The deposition calculating part 51 calculates the amount of PM deposition based on the first estimated value and the second estimated value. Due to this, compared with when the amount of PM deposition is calculated by either of the differential pressure method and temperature method, the precision of calculation of the amount of PM deposition can be raised.

The engine control part 52 controls the internal combustion engine based on the amount of PM deposition calculated by the deposition calculating part 51. If the filter 23 is regenerated when the amount of PM deposition is large, the temperature of the filter 23 excessively increases and the filter 23 is liable to deteriorate. For this reason, for example, the engine control part 52 restricts the output of the internal combustion engine so as to keep down the increase of the exhaust temperature when the amount of PM deposition is equal to or more than a predetermined amount. Note that, the engine control part 52 may prohibit fuel cut control or limit the time of continuous performance of fuel cut control if the amount of PM deposition is equal to or more than a predetermined amount.

Further, if the amount of PM deposition becomes greater, the filter 23 will clog and the back pressure will increase. For this reason, the engine control part 52 may regenerate the filter 23 to quickly reduce the amount of PM deposition if the amount of PM deposition is equal to or more than a predetermined amount. Specifically, the engine control part 52 may perform lean control where the target air-fuel ratio of the air-fuel mixture supplied to the combustion chambers 5 is set to a lean air-fuel ratio leaner than the stoichiometric air-fuel ratio, when the amount of PM deposition is equal to or more than a predetermined amount. If lean control is performed, oxygen is supplied to the filter 23 and the combustion of PM is promoted.

<Processing for Calculation of Amount of Deposition>

Figure 5:
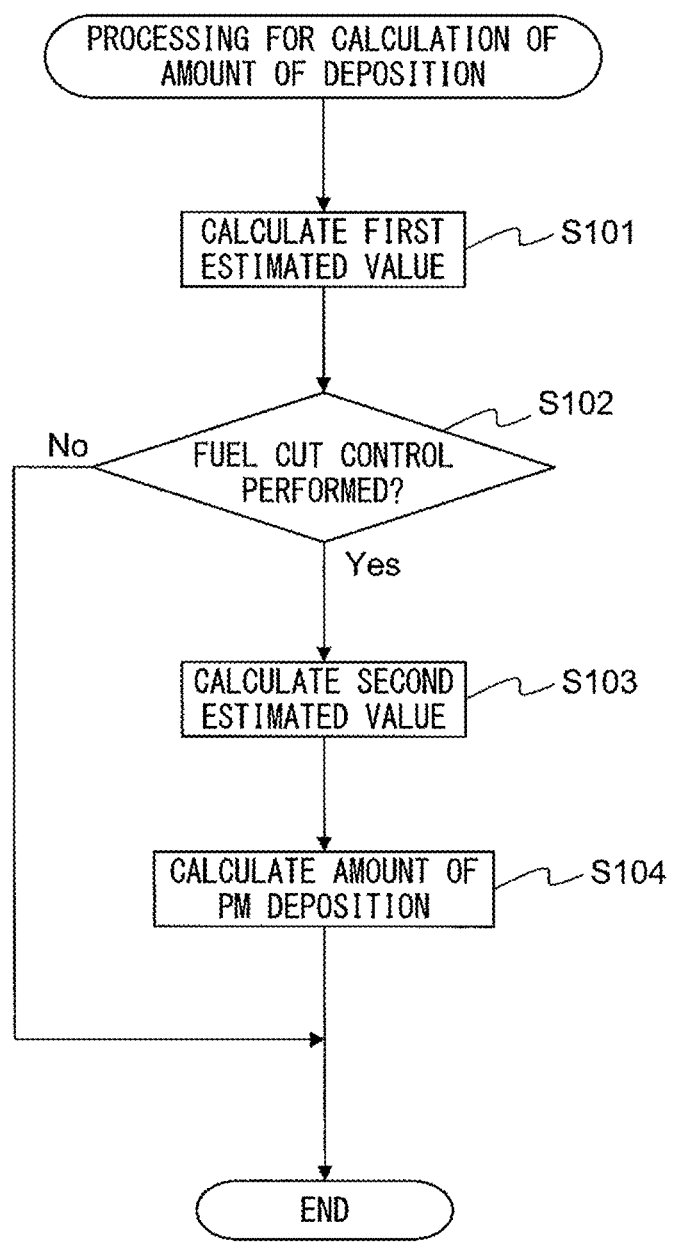
FIG. 5 is a flow chart showing a control routine of processing for calculation of an amount of deposition in the first embodiment of the present invention.

Below, referring to the flow chart of FIG. 5, control for calculating the amount of PM deposition will be explained in detail. FIG. 5 is a flow chart showing a control routine of processing for calculation of an amount of deposition in the first embodiment of the present invention. The present control routine is repeatedly performed by the ECU 31 at predetermined time intervals.

First, at step S101, the deposition calculating part 51 uses a map or calculation formula to calculate a first estimated value of the amount of PM deposition based on the differential pressure detected by the differential pressure sensor 40. The first estimated value becomes larger the larger the differential pressure.

Next, at step S102, the deposition calculating part 51 judges whether fuel cut control has been performed. If it is judged that fuel cut control has not been performed, the present control routine ends. On the other hand, if it is judged that fuel cut control has been performed, the present control routine proceeds to step S103.

At step S103, the deposition calculating part 51 calculates the second estimated value of the amount of PM deposition based on the amount of increase of the temperature of the outflowing exhaust gas due to the supply of oxygen to the filter 23. The second estimated value becomes larger the larger the amount of increase of the temperature of the outflowing exhaust gas.

For example, the deposition calculating part 51 subtracts the temperature detected by the temperature sensor 41 when fuel cut control was started from the maximum value of the temperature detected by the temperature sensor 41 when fuel cut control was performed so as to calculate the amount of increase of the temperature of the outflowing exhaust gas. Note that, the deposition calculating part 51 may subtract the temperature detected by the temperature sensor 41 when fuel cut control was started from the temperature detected by the temperature sensor 41 when a predetermined time elapsed from when fuel cut control was started so as to calculate the amount of increase of the temperature of the outflowing exhaust gas.

Next, at step S104, the deposition calculating part 51 calculates the amount of PM deposition based on the first estimated value and the second estimated value. For example, the deposition calculating part 51 calculates the amount of PM deposition as the mean value of the first estimated value and the second estimated value. After step S104, the present control routine is ended.

Note that, at step S103, the deposition calculating part 51 may judge whether the fuel cut control has been performed for a predetermined time or more. Further, at step S103, the deposition calculating part 51 may judge whether lean control where the target air-fuel ratio of the air-fuel mixture supplied to the combustion chambers 5 is set to a lean air-fuel ratio leaner than the stoichiometric air-fuel ratio was performed. That is, the deposition calculating part 51 may calculate the second estimated value of the amount of PM deposition based on the amount of increase of the temperature of the outflowing exhaust gas when lean control was performed.

Figure 6:
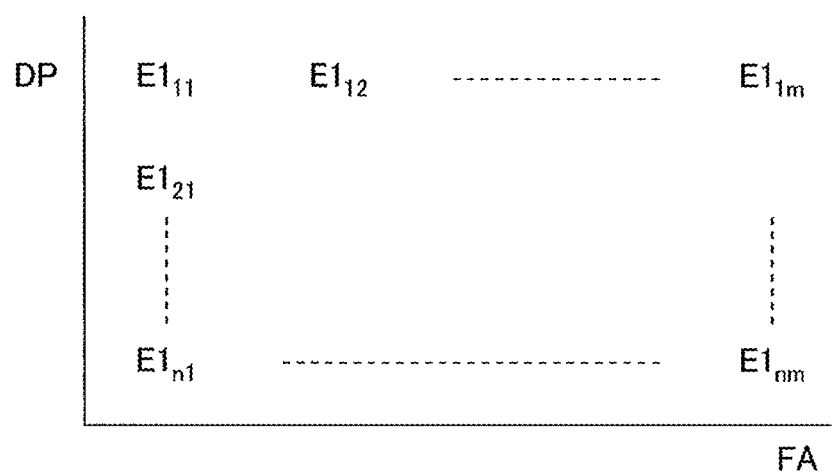
FIG. 6 is a view showing a map for calculating a first estimated value based on a differential pressure before and after a filter and an amount of flow of inflowing exhaust gas.

Further, even if the amount of PM deposition is constant, the differential pressure before and after the filter 23 is affected by the amount of flow of the exhaust gas flowing into the filter 23 (below, referred to as the "inflowing exhaust gas"). For this reason, at step S101, the deposition calculating part 51, for example, uses the map such as shown in FIG. 6 to calculate the first estimated value E1 based on the differential pressure DP before and after the filter 23 and the amount of flow FA of the inflowing exhaust gas. Due to this, it is possible to raise the reliability of the first estimated value. In this case, the amount of flow FA of the inflowing exhaust gas is basically proportional to the amount of flow of intake air, so for example the deposition calculating part 51 calculates the amount of flow FA of inflowing exhaust gas based on the amount of flow of intake air detected by the air flow meter 39.

Figure 7:
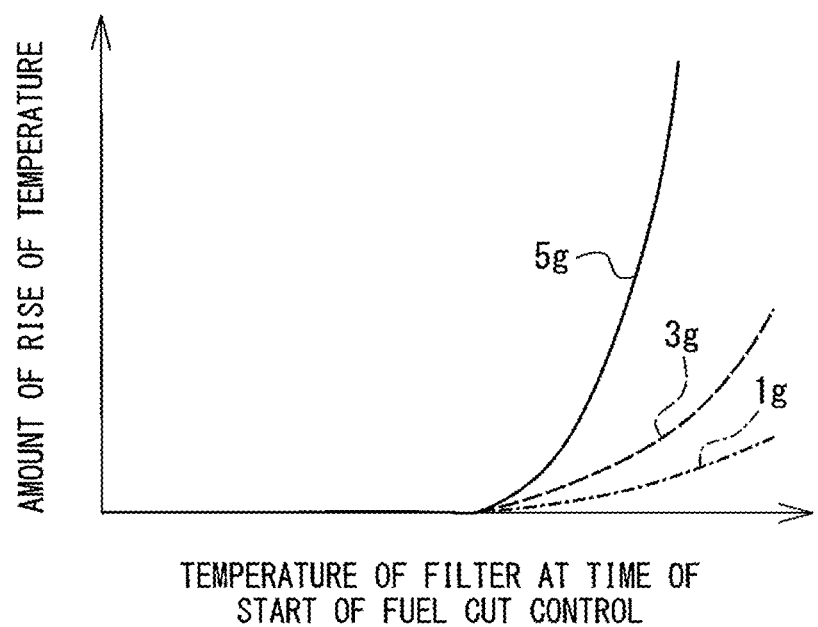
FIG. 7 is a view showing a relationship between an amount of increase of temperature of outflowing exhaust gas when an amount of deposition of PM is a predetermined amount and a temperature of a filter when fuel cut control is started.

Further, even if the amount of PM deposition is constant, the amount of increase of the temperature of the outflowing exhaust gas is affected by the temperature of the filter 23 when the supply of oxygen to the filter 23 is started. FIG. 7 is a view showing the relationship between the amount of increase of the temperature of the outflowing exhaust gas when the amount of PM deposition is a predetermined amount and a temperature of the filter 23 when fuel cut control is started. The figure shows the relationship when the amount of PM deposition is 5 g by a solid line, shows the relationship when the amount of PM deposition is 3 g by a broken line, and shows the relationship when the amount of PM deposition is 1 g by a one-dot chain line.

As shown in FIG. 7, when the temperature of the filter 23 at the time of start of fuel cut control is low, the temperature of the outflowing exhaust gas does not increase much at all. On the other hand, the higher the temperature of the filter 23 at the time of start of fuel cut control, the larger the amount of increase of the temperature of the outflowing exhaust gas becomes.

Figure 8:
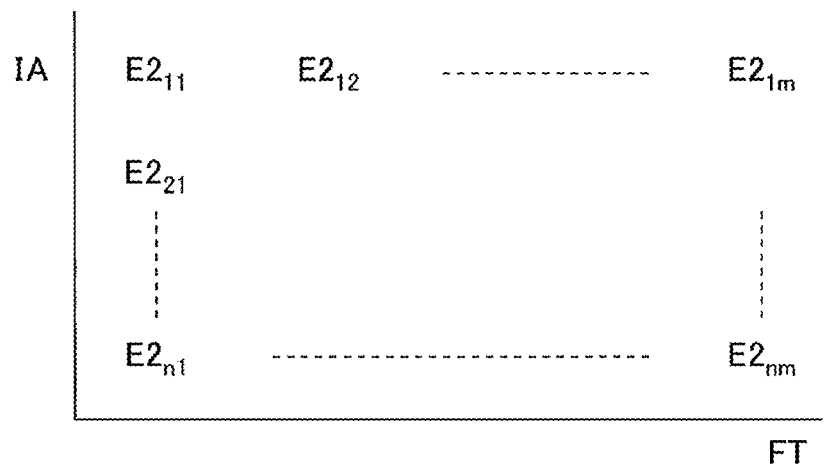
FIG. 8 is a view showing a map for calculating a second estimated value based on an amount of increase of temperature of outflowing exhaust gas, and a temperature of a filter when oxygen starts to be supplied to the filter.

For this reason, at step S103, the deposition calculating part 51 may, for example, use a map such as shown in FIG. 8 to calculate the second estimated value E2 based on the amount of increase IA of the temperature of the outflowing exhaust gas and the temperature FT of the filter 23 when the supply of oxygen to the filter 23 is started, for example, the temperature of the filter 23 when fuel cut control is performed. By doing this, it is possible to raise the reliability of the second estimated value. In this case, the deposition calculating part 51 calculates the temperature of the filter 23 when the supply of oxygen to the filter 23 is started based on the temperature detected by the temperature sensor 41 when the supply of oxygen to the filter 23 is started. Note that, the temperature detected by the temperature sensor 41 may be deemed the temperature of the filter 23.

Further, to make the temperature of the inflowing exhaust gas increase, when the filter 23 is supplied with oxygen, sometimes the catalyst 20 is supplied with fuel. For example, by post injection injecting fuel from the fuel injectors 11 in the expansion strokes at the cylinders, the catalyst 20 can be supplied with fuel (unburned fuel). Further, by providing a fuel injector in the exhaust passage at the upstream side from the catalyst 20 and supplying fuel from this fuel injector to the exhaust passage as well, it is possible to supply fuel to the catalyst 20.

If the catalyst 20 is supplied with fuel, the oxygen reacts with the fuel and the oxygen is consumed at the catalyst 20. As a result, the concentration of oxygen in the inflowing exhaust gas changes. The amount of increase of the temperature of the outflowing exhaust gas fluctuates in accordance with the concentration of oxygen in the inflowing exhaust gas. Specifically, the higher the concentration of oxygen in the inflowing exhaust gas, the larger the amount of increase of the temperature of the outflowing exhaust gas.

For this reason, if fuel is supplied to the catalyst 20 when oxygen is supplied to the filter 23, the deposition calculating part 51 may consider the concentration of oxygen in the inflowing exhaust gas to calculate the second estimated value. By doing this, it is possible to keep the reliability of the second estimated value from falling when the catalyst 20 is supplied with fuel.

In this case, for example, the deposition calculating part 51 corrects the amount of increase of the temperature of the outflowing exhaust gas based on the concentration of oxygen in the inflowing exhaust gas and calculates the second estimated value based on the amount of increase after correction. The concentration of oxygen in the inflowing exhaust gas is calculated based on the amount of supply of fuel to the catalyst 20.

Figure 9:
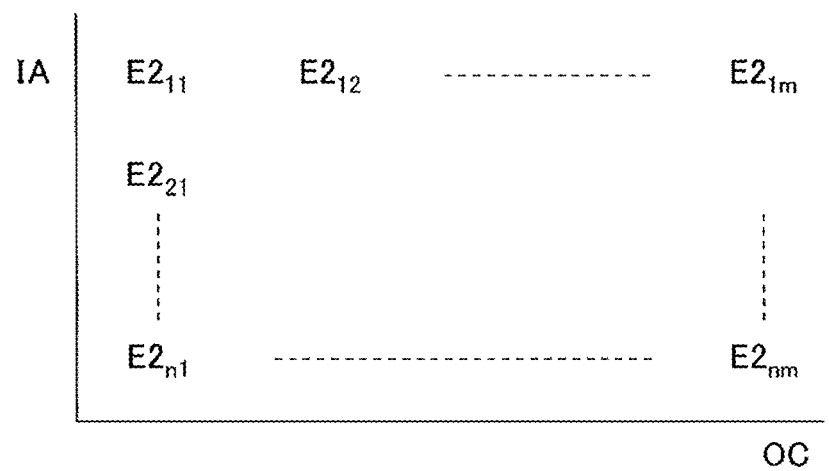
FIG. 9 is a view showing a map for calculating a second estimated value based on an amount of increase of temperature of outflowing exhaust gas and a concentration of oxygen in inflowing exhaust gas.
Figure 10:
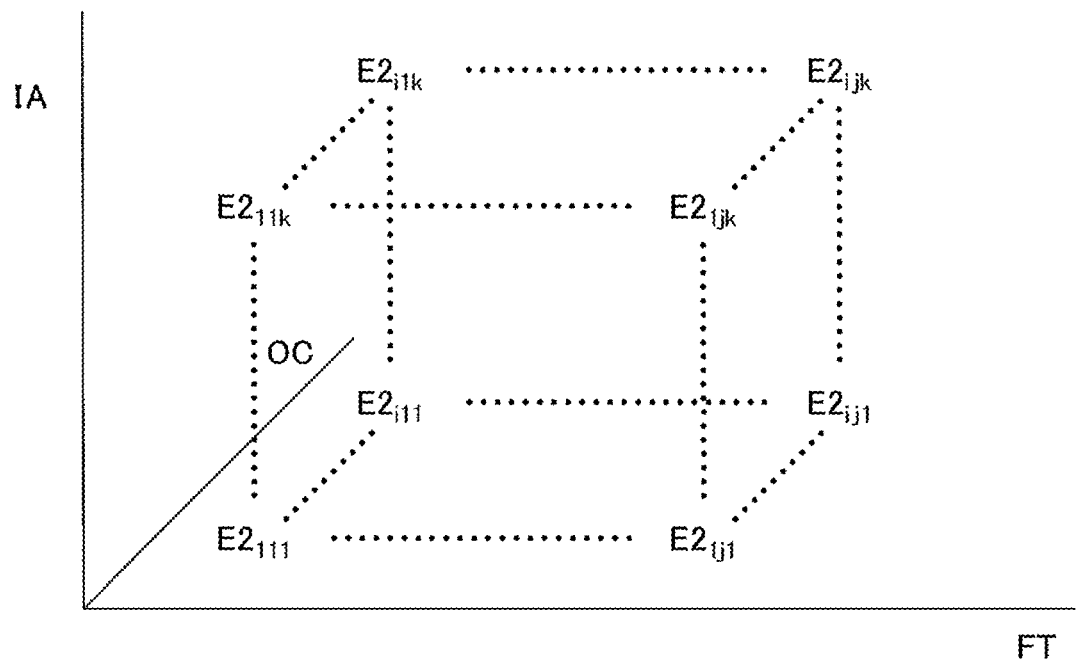
FIG. 10 is a view showing a map for calculating a second estimated value based on an amount of increase of temperature of outflowing exhaust gas, a temperature of a filter when supply of oxygen to the filter is started, and a concentration of oxygen in inflowing exhaust gas.

Note that, the deposition calculating part 51 may use a map such as shown in FIG. 9 to calculate the second estimated value E2 based on the amount of increase IA of the temperature of the outflowing exhaust gas and the concentration of oxygen OC in the inflowing exhaust gas. Further, the deposition calculating part 51 may use the three-dimensional map such as shown in FIG. 10 to calculate the second estimated value E2 based on the amount of increase IA of the temperature of the outflowing exhaust gas, the temperature FT of the filter 23 when the supply of oxygen to the filter 23 is started, and the concentration of oxygen OC in the inflowing exhaust gas.

Note that, the configuration of the internal combustion engine is not limited to the above-mentioned configuration. Therefore, the specific configuration of the internal combustion engine such as the cylinder array, injection mode of fuel, configuration of the intake/exhaust system, configuration of the valve operating mechanism, and the presence of supercharger may be different from the configuration shown in FIG. 1. For example, the fuel injectors 11 may be configured so as to inject fuel to the insides of the intake ports 7.

Further, if the filter 23 clogs due to PM, the pressure in the exhaust passage at the upstream side from the filter 23 becomes higher. As a result, the larger the amount of PM deposition, the larger the differential pressure between the pressure in the exhaust passage at the upstream side from the filter 23 and the atmospheric pressure. For this reason, the differential pressure sensor 40 may detect the differential pressure between the pressure in the exhaust passage at the upstream side from the filter 23 and the atmospheric pressure, instead of the differential pressure before and after the filter 23.

Second Embodiment

The exhaust purification system according to a second embodiment is basically the same as the exhaust purification according to the first embodiment in configuration and control except for the points explained below. For this reason, below, the second embodiment of the present invention will be explained centered on parts different from the first embodiment.

If the amount of flow of the inflowing exhaust gas is small, the amount of change of the differential pressure before and after the filter 23 when the amount of PM deposition changes becomes smaller. For this reason, it is preferable to calculate the first estimated value based on the differential pressure detected by the differential pressure sensor 40 when the amount of flow of the inflowing exhaust gas is large. Further, if the amount of fluctuation of the amount of flow of the inflowing exhaust gas is large, the error of the first estimated value is liable to become larger.

For this reason, in the second embodiment, the deposition calculating part 51 calculates the first estimated value based on the differential pressure detected by the differential pressure sensor 40 when the amount of flow of the inflowing exhaust gas is equal to or more than a predetermined amount of flow and the amount of fluctuation of the amount of flow of the inflowing exhaust gas is equal to or less than a predetermined value. By doing this, the reliability of the first estimated value can be raised.

Further, as shown in FIG. 7, when the temperature of the filter 23 when the supply of oxygen to the filter 23 is started is low, the supply of oxygen to the filter 23 does not cause the temperature of the outflowing exhaust gas to increase much at all. For this reason, in the second embodiment, the deposition calculating part 51 calculates the second estimated value based on the amount of increase of the temperature of the outflowing exhaust gas only if the temperature of the filter 23 when the supply of oxygen to the filter 23 is started is equal to or more than a predetermined temperature. In other words, the deposition calculating part 51 does not calculate the second estimated value when the temperature of the filter 23 when the supply of oxygen of the filter 23 is started is less than a predetermined temperature. By doing this, it is possible to raise the reliability of the second estimated value.

Further, if the timing of calculation of the first estimated value and the timing of calculation of the second estimated value are separated, sometimes the actual amount of PM deposition will fluctuate between the previous timing of calculation and subsequent timing of calculation. For this reason, in the second embodiment, the deposition calculating part 51 does not calculate the amount of PM deposition based on the first estimated value and the second estimated value if the difference of the timing of calculation of the first estimated value and the timing of calculation of the second estimated value is equal to or more than a predetermined time. By doing this, the precision of calculation of the amount of PM deposition can be further improved.

However, if the amount of PM deposition is not calculated, it is not possible to perform suitable control according to the amount of PM deposition in the internal combustion engine. For this reason, even if the precision of calculation falls, it is desirable to be able to always calculate the amount of PM deposition. Therefore, in the second embodiment, the deposition calculating part 51 calculates the amount of PM deposition based on the operating state of the internal combustion engine if not calculating the amount of PM deposition based on the first estimated value and the second estimated value. By doing this, it is possible to prevent the frequency of calculation of the amount of PM deposition from falling.

<Processing for Calculation of Amount of Deposition>

Figure 11A:
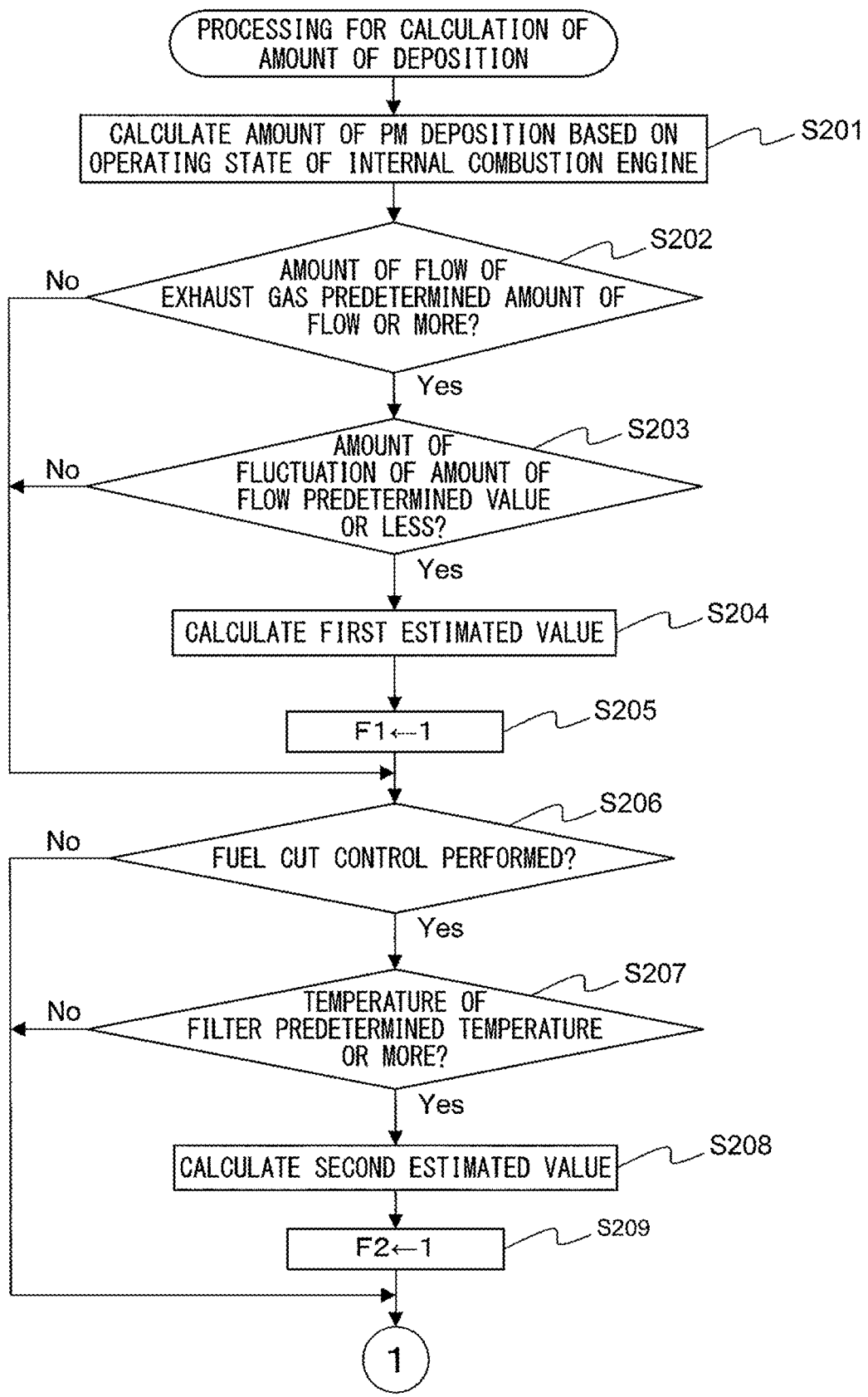
FIG. 11A is a flow chart showing a control routine of processing for calculation of an amount of deposition in a second embodiment of the present invention.

FIG. 11A and FIG. 11B are flow charts showing the control routine of processing for calculation of the amount of deposition in the second embodiment of the present invention. The present control routine is repeatedly performed by the ECU 31 at predetermined time intervals.

First, at step S201, the deposition calculating part 51 calculates the amount of PM deposition based on the operating state of the internal combustion engine. Specifically, the deposition calculating part 51 calculates the amount of change of the amount of PM deposition based on the engine load and engine speed and cumulatively adds this amount of change to calculate the amount of PM deposition. The engine load is calculated based on the output of the load sensor 43, and the engine speed is calculated based on the output of the crank angle sensor 44.

Next, at step S202, the deposition calculating part 51 judges whether the amount of flow of the inflowing exhaust gas is equal to or more than a predetermined amount of flow. The predetermined amount of flow is determined in advance. The amount of flow of the inflowing exhaust gas is calculated based on the amount of flow of intake air detected by the air flow meter 39. If at step S202 it is judged that the amount of flow of the inflowing exhaust gas is equal to or more than the predetermined amount of flow, the present control routine proceeds to step S203.

At step S203, the deposition calculating part 51 judges whether the amount of fluctuation of the amount of flow of the inflowing exhaust gas is equal to or less than a predetermined value. The predetermined value is determined in advance. The amount of fluctuation of the amount of flow is, for example, calculated as the difference between the maximum value and minimum value of the amount of flow calculated during a predetermined time. If at step S203 it is judged that the amount of fluctuation of the amount of flow of the inflowing exhaust gas is equal to or less than a predetermined value, the present control routine proceeds to step S204.

At step S204, in the same way as step S101 of FIG. 5, the deposition calculating part 51 calculates the first estimated value of the amount of PM deposition. Next, at step S205, the deposition calculating part 51 sets a first flag F1 to "1". The first flag F1 is a flag which is set to "1" when the first estimated value is calculated. The initial value of the first flag F1 is zero.

After step S205, the present control routine proceeds to step S206. On the other hand, if at step S202 it is judged that the amount of flow of the inflowing exhaust gas is less than a predetermined amount of flow or if at step S203 it is judged that the amount of fluctuation of the amount of flow of inflowing exhaust gas is larger than a predetermined value, the present control routine skips step S204 and step S205 and proceeds to step S206. In this case, the first estimated value is not calculated.

At step S206, in the same way as step S103 of FIG. 5, the deposition calculating part 51 judges whether fuel cut control was performed. If it is judged that fuel cut control was performed, the present control routine proceeds to step S207.

At step S207, the deposition calculating part 51 judges whether the temperature of the filter 23 when fuel cut control is started is equal to or more than a predetermined temperature. The predetermined temperature is determined in advance. The temperature of the filter 23 when fuel cut control is started is calculated based on the temperature of the outflowing exhaust gas detected by the temperature sensor 41 when fuel cut control is started. If at step S207 it is judged that the temperature of the filter 23 when fuel cut control is started is equal to or more than the predetermined temperature, the present control routine proceeds to step S208.

At step S208, in the same way as step S103 of FIG. 5, the deposition calculating part 51 calculates the second estimated value of the amount of PM deposition. Next, at step S209, the deposition calculating part 51 sets a second flag F2 to "1". The second flag F2 is a flag which is set to "1" when the second estimated value is calculated. The initial value of the second flag F1 is zero.

After step S209, the present control routine proceeds to step S210. On the other hand, if at step S206 it was judged that fuel cut control was not performed or if at step S207 it was judged that the temperature of the filter 23 when fuel cut control was started was less than the predetermined temperature, the present control routine skips step S208 and step S209 and proceeds to step S210. In this case, the second estimated value is not calculated.

At step S210, the deposition calculating part 51 judges whether the first flag F1 and the second flag F2 are "1". If it is judged that the first flag F1 and the second flag F2 are "1", the present control routine proceeds to step S211.

At step S211, the deposition calculating part 51 judges whether the difference between the timing of calculation of the first estimated value and the timing of calculation of the second estimated value is equal to or more than a predetermined time. The predetermined time is determined in advance. Note that, for the timing of calculation of the first estimated value and the timing of calculation of the second estimated value, the values calculated last are respectively used. If at step S211 it is judged that the difference between the timing of calculation of the first estimated value and the timing of calculation of the second estimated value is less than the predetermined time, the present control routine proceeds to step S212.

At step S212, in the same way as step S104 of FIG. 5, the deposition calculating part 51 calculates the amount of PM deposition based on the first estimated value and the second estimated value. As a result, the amount of PM deposition is rewritten from the value calculated at step S201 to the value calculated at step S212. In this case, the engine control part 52 controls the internal combustion engine based on the amount of PM deposition calculated based on the first estimated value and the second estimated value.

Next, at step S213, the deposition calculating part 51 resets the first flag F1 and the second flag F2 to zero. After step S213, the present control routine ends.

On the other hand, if at step S210 it is judged that at least one of the first flag F1 and the second flag F2 is zero or if at step S211 it is judged that the difference between the timing of calculation of the first estimated value and the timing of calculation of the second estimated value is equal to or more than a predetermined time, the present control routine is ended. In this case, the engine control part 52 controls the internal combustion engine based on the amount of PM deposition calculated based on the operating state of the internal combustion engine.

Note that, at step S211, the deposition calculating part 51 may judge whether the total of the amounts of intake air supplied to the combustion chambers 5 between the timing of calculation of the first estimated value and the timing of calculation of the second estimated value is equal to or more than a predetermined amount. That is, the deposition calculating part 51 may not calculate the amount of PM deposition based on the first estimated value and the second estimated value if the total of the amount of intake air supplied to the combustion chambers 5 between the timing of calculation of the first estimated value and the timing of calculation of the second estimated value is equal to or more than a predetermined amount. The total of the amount of intake air is calculated based on the output of the air flow meter 39.

Further, at step S211, the deposition calculating part 51 may judge whether the total of the amounts of fuel supplied to the combustion chambers 5 between the timing of calculation of the first estimated value and the timing of calculation of the second estimated value is equal to or more than a predetermined amount. That is, the deposition calculating part 51 may not calculate the amount of PM deposition based on the first estimated value and the second estimated value if the total of the amount of fuel supplied to the combustion chambers 5 between the timing of calculation of the first estimated value and the timing of calculation of the second estimated value is equal to or more than a predetermined amount. The total of the amount of fuel is calculated based on the command values output from the ECU 31 to the fuel injectors 11.

Further, among step S201 to step S203, step S207, and step S211, any four or less steps may be omitted. Further, the present control routine can be changed in the same way as the control routine of FIG. 5.

Third Embodiment

The exhaust purification system according to a third embodiment is basically the same as the exhaust purification according to the first embodiment in configuration and control except for the points explained below. For this reason, below, the third embodiment of the present invention will be explained centered on parts different from the first embodiment.

As explained above, an error arises between the first estimated value corresponding to the amount of PM deposition calculated by the differential pressure method and the second estimated value corresponding to the amount of PM deposition calculated by the temperature method. Further, the width of the error fluctuates in accordance with the value of the parameter used for calculating the amount of PM deposition.

For this reason, in the third embodiment, the deposition calculating part 51 calculates the first estimated value and the second estimated value as values having widths. Further, the deposition calculating part 51 calculates a value in the range where the range of the first estimated value and the range of the second estimated value overlap as the amount of PM deposition. That is, the deposition calculating part 51 does not calculate the amount of PM deposition based on the first estimated value and the second estimated value if the range of the first estimated value and the range of the second estimated value do not overlap. By calculating the amount of PM deposition in the above way, it is possible to raise the precision of calculation of the amount of PM deposition.

Further, if the error of the first estimated value and the second estimated value is large, the width of the range where the range of the first estimated value and the range of the second estimated value overlap (below, referred to as the "overlapping range") becomes larger. For this reason, if the width of the overlapping range is equal to or more than a predetermined value, the deposition calculating part 51 does not calculate the amount of PM deposition based on the first estimated value and the second estimated value. By doing this, it is possible to further raise the precision of calculation of the amount of PM deposition.

Further, in the third embodiment, in the same way as the second embodiment, if the deposition calculating part 51 does not calculate the amount of PM deposition based on the first estimated value and the second estimated value, it calculates the amount of PM deposition based on the operating state of the internal combustion engine. By doing this, it is possible to prevent the frequency of calculation of the amount of PM deposition from falling.

<Processing for Calculation of Amount of Deposition>

FIG. 12 is a flow chart showing a control routine of processing for calculation of an amount of deposition in the third embodiment of the present invention. The present control routine is repeatedly performed by the ECU 31 at predetermined time intervals.

First, at step S301, in the same way as step S201 of FIG. 11A, the deposition calculating part 51 calculates the amount of PM deposition based on the operating state of the internal combustion engine.

Next, at step S302, in the same way as step S101 of FIG. 5, the deposition calculating part 51 calculates the first estimated value of the amount of PM deposition. At this time, the deposition calculating part 51 calculates the first estimated value as a value having width (for example 3 to 5 g). If the first estimated value is calculated based on the amount of flow of the inflowing exhaust gas, the smaller the amount of flow of the inflowing exhaust gas, the broader the range of the first estimated value.

Next, at step S303, in the same way as step S103 of FIG. 5, the deposition calculating part 51 judges whether fuel cut control has been performed. If it is judged that fuel cut control has been performed, the present control routine proceeds to step S304.

At step S304, in the same way as step S103 of FIG. 5, the deposition calculating part 51 calculates the second estimated value of the amount of PM deposition. At this time, the deposition calculating part 51 calculates the second estimated value as a value having width. The smaller the amount of increase of the temperature of the outflowing exhaust gas due to the supply of oxygen to the filter 23, the broader the range of the second estimated value. Further, if the second estimated value is calculated based on the temperature of the filter 23 when the supply of oxygen to the filter 23 is started, the lower the temperature of the filter 23 when the supply of oxygen to the filter 23 is started, the broader the range of the second estimated value.

Next, at step S305, the deposition calculating part 51 judges whether the range of the first estimated value and the range of the second estimated value overlap. If it is judged that the range of the first estimated value and the range of the second estimated value overlap, the present control routine proceeds to step S306.

At step S306, the deposition calculating part 51 judges whether the width of the overlapping range is equal to or more than a predetermined value. The predetermined value is determined in advance. If at step S306 the width of the overlapping range is less than the predetermined value, the present control routine proceeds to step S307.

At step S307, the deposition calculating part 51 calculates the amount of PM deposition based on the first estimated value and the second estimated value. Specifically, the deposition calculating part 51 calculates a value in a range where a range of the first estimated value and a range of the second estimated value overlap as the amount of PM deposition.

Figure 13:
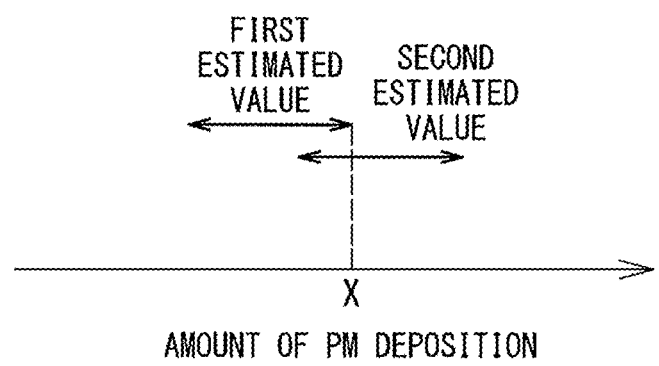
FIG. 13 is a view showing an example of overlap of a range of the first estimated value and a range of the second estimated value.

For example, the deposition calculating part 51 calculates a maximum value of a range where a range of the first estimated value and a range of the second estimated value overlap (value X in example of FIG. 13) as the amount of PM deposition. By doing this, it is possible to keep the amount of PM deposition from being estimated smaller than the actual value. As a result, it is possible to perform the necessary control in the internal combustion engine before the actual amount of PM deposition becomes excessive. After step S307, the present control routine is ended.

Note that, at least one of step S301 and step S306 may be omitted. Further, the present control routine can be changed in the same way as the control routine of FIG. 5.

Other Embodiments

Above, preferred embodiments according to the present invention were explained, but the present invention is not limited to these embodiments and can be corrected and changed in various ways within the language of the claims. For example, the catalyst 20 may be omitted from the exhaust purification system.

Further, the internal combustion engine may be a diesel engine fueled by diesel fuel. In this case, in the exhaust passage of the internal combustion engine, an oxidation catalyst is arranged as the catalyst 20 and a diesel particulate filter (DPF) is arranged as the filter 23.

Further, an upstream side temperature sensor detecting the temperature of inflowing exhaust gas may be arranged at the exhaust passage at the upstream side from the filter 23. In this case, the deposition calculating part 51 may subtract the temperature detected by the upstream side temperature sensor from the temperature detected by the temperature sensor 41 to calculate the amount of increase of the temperature of the outflowing exhaust gas.

Further, the above embodiments can be worked freely combined. For example, if the second embodiment and the third embodiment are combined, as the values having width at step S204 and step S208 of FIG. 11A, the first estimated value and the second estimated value are calculated, and step S305 and step S306 of FIG. 12 are performed between step S211 and step S212 of FIG. 11B.

REFERENCE SIGNS LIST 22. exhaust pipe
23. filter
40. differential pressure sensor
41. temperature sensor
51. deposition calculating part

The invention claimed is:

1. An exhaust purification system of an internal combustion engine, comprising:
    a filter arranged in an exhaust passage of the internal combustion engine and trapping particulate matter in exhaust gas,
    a differential pressure sensor detecting a differential pressure before and after the filter or a differential pressure between a pressure in the exhaust passage at an upstream side from the filter and an atmospheric pressure,
    a temperature sensor arranged in the exhaust passage at a downstream side from the filter and detecting a temperature of exhaust gas flowing out from the filter, and
    a processor configured to calculate an amount of particulate matter deposited at the filter, wherein
    the processor is configured to calculate a first estimated value of the amount of the particulate matter based on the differential pressure, calculate a second estimated value of the amount of the particulate matter based on an amount of increase of the temperature of the exhaust gas due to supply of oxygen to the filter, and calculate the amount of the particulate matter based on the first estimated value and the second estimated value, and
    the processor is configured to calculate the first estimated value based on the differential pressure detected by the differential pressure sensor when an amount of flow of the exhaust gas flowing into the filter is equal to or more than a predetermined amount of flow.

2. The exhaust purification system of the internal combustion engine according to claim 1, wherein
    the processor is configured to calculate a value in an overlapping range where a first range of the first estimated value and a second range of the second estimated value overlap as the amount of the particulate matter.

3. The exhaust purification system of the internal combustion engine according to claim 2, wherein
    the processor is configured to calculate a maximum value in the overlapping range where the first range of the first estimated value and the second range of the second estimated value overlap as the amount of the particulate matter.

4. The exhaust purification system of the internal combustion engine according to claim 2, wherein
    the processor is configured not to calculate the amount of the particulate matter based on the first estimated value and the second estimated value if a width of the overlapping range where the first range of the first estimated value and the second range of the second estimated value overlap is equal to or more than a predetermined value.

5. The exhaust purification system of the internal combustion engine according to claim 1, wherein
    the processor is configured to calculate the first estimated value based on the differential pressure detected by the differential pressure sensor when the amount of flow of the exhaust gas is equal to or more than the predetermined amount of flow and an amount of fluctuation of the amount of flow is equal to or less than a predetermined value.

6. The exhaust purification system of the internal combustion engine according to claim 1, wherein
    the processor is configured to calculate the second estimated value only when a temperature of the filter when supply of oxygen to the filter is started is equal to or more than a predetermined temperature.

7. The exhaust purification system of the internal combustion engine according to claim 1, wherein
    the processor is configured to calculate the amount of the particulate matter based on an operating state of the internal combustion engine if not calculating the amount of the particulate matter based on the first estimated value and the second estimated value.

8. The exhaust purification system of the internal combustion engine according to claim 1, further comprising a catalyst arranged in the exhaust passage at an upstream side from the filter, wherein
    the processor is configured to calculate the second estimated value considering a concentration of oxygen in the exhaust gas flowing into the filter if the catalyst is supplied with fuel when the filter is supplied with oxygen.

9. An exhaust purification system of an internal combustion engine, comprising:
- a filter arranged in an exhaust passage of the internal combustion engine and trapping particulate matter in exhaust gas,
- a differential pressure sensor detecting a differential pressure before and after the filter or a differential pressure between a pressure in the exhaust passage at an upstream side from the filter and an atmospheric pressure,
- a temperature sensor arranged in the exhaust passage at a downstream side from the filter and detecting a temperature of exhaust gas flowing out from the filter, and
- a processor configured to calculate an amount of particulate matter deposited at the filter, wherein
- the processor is configured to calculate a first estimated value of the amount of the particulate matter based on the differential pressure, calculate a second estimated value of the amount of the particulate matter based on an amount of increase of the temperature of the exhaust gas due to supply of oxygen to the filter, and calculate the amount of the particulate matter based on the first estimated value and the second estimated value, and
- the processor is configured to calculate the second estimated value based on the amount of increase of the temperature of the exhaust gas when fuel cut control stopping supply of fuel to combustion chambers of the internal combustion engine is performed.

10. An exhaust purification system of an internal combustion engine, comprising:
- a filter arranged in an exhaust passage of the internal combustion engine and trapping particulate matter in exhaust gas,
- a differential pressure sensor detecting a differential pressure before and after the filter or a differential pressure between a pressure in the exhaust passage at an upstream side from the filter and an atmospheric pressure,
- a temperature sensor arranged in the exhaust passage at a downstream side from the filter and detecting a temperature of exhaust gas flowing out from the filter, and
- a processor configured to calculate an amount of particulate matter deposited at the filter, wherein
- the processor is configured to calculate a first estimated value of the amount of the particulate matter based on the differential pressure, calculate a second estimated value of the amount of the particulate matter based on an amount of increase of the temperature of the exhaust gas due to supply of oxygen to the filter, and calculate the amount of the particulate matter based on the first estimated value and the second estimated value, and
- the processor is configured not to calculate the amount of the particulate matter based on the first estimated value and the second estimated value if a difference between a timing of calculation of the first estimated value and a timing of calculation of the second estimated value is equal to or more than a predetermined time, if a total of an amount of intake air supplied to combustion chambers of the internal combustion engine between the timing of calculation of the first estimated value and the timing of calculation of the second estimated value is equal to or more than a predetermined amount, or if a total of an amount of fuel supplied to the combustion chambers of the internal combustion engine between the timing of calculation of the first estimated value and the timing of calculation of the second estimated value is equal to or more than a predetermined amount.

* * * * *